United States Patent
Yee et al.

(10) Patent No.: US 10,488,223 B1
(45) Date of Patent: Nov. 26, 2019

(54) METHODS AND SYSTEMS FOR CALIBRATING AN INERTIAL MEASUREMENT UNIT OF AN ELECTRONIC DEVICE

(71) Applicant: Facebook Technologies, LLC, Menlo Park, CA (US)

(72) Inventors: Phillip Yee, San Francisco, CA (US); Julian James Hammerstein, Woodside, CA (US); Ryan Hamilton Brown, Austin, TX (US); Nirav Rajendra Patel, San Francisco, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 254 days.

(21) Appl. No.: 15/703,763

(22) Filed: Sep. 13, 2017

(51) Int. Cl.
*G01C 25/00* (2006.01)
*G01P 15/14* (2013.01)
*G02B 27/01* (2006.01)
*G01P 21/00* (2006.01)

(52) U.S. Cl.
CPC .......... *G01C 25/005* (2013.01); *G01P 15/14* (2013.01); *G02B 27/017* (2013.01); *G01P 21/00* (2013.01)

(58) Field of Classification Search
CPC ....... G01C 25/005; G01P 15/14; G01P 21/00; G02B 27/017
USPC ............................................................ 345/8
See application file for complete search history.

(56) References Cited

U.S. PATENT DOCUMENTS

| | | | | |
|---|---|---|---|---|
| 2017/0079599 A1* | 3/2017 | Yoshida | ............... | G06T 7/40 |
| 2017/0221273 A1* | 8/2017 | Haseltine | ............... | G06F 3/011 |
| 2017/0336863 A1* | 11/2017 | Tilton | ............... | G06F 3/012 |
| 2018/0132116 A1* | 5/2018 | Shekhar | ............... | H01Q 1/246 |
| 2018/0232047 A1* | 8/2018 | Yoon | ............... | G06T 7/90 |
| 2018/0249151 A1* | 8/2018 | Freeman | ............... | G16H 20/30 |
| 2018/0286268 A1* | 10/2018 | Ni | ............... | G06F 3/011 |
| 2018/0307305 A1* | 10/2018 | Babu | ............... | G06F 3/012 |
| 2018/0329483 A1* | 11/2018 | Hsieh | ............... | G06T 11/00 |

* cited by examiner

*Primary Examiner* — Jennifer Mehmood
*Assistant Examiner* — Ngan T Pham Lu
(74) *Attorney, Agent, or Firm* — Morgan, Lewis & Bockius LLP (57) ABSTRACT

A method of calibrating a first inertial measurement unit (IMU) of a mobile electronic device inserted in a headset includes, when a controller having a second IMU is mounted to the headset: performing a calibration procedure to generate first calibration data for the first IMU and second calibration data for the second IMU; receiving the second calibration data from the controller; determining a difference between the first calibration data and the second calibration data received from the controller; and calibrating the first IMU in accordance with the difference between the first calibration data and the second calibration data. The method further includes, when the controller has been removed from the headset after performing the calibrating, executing a virtual-reality application, comprising generating images based in part on motion data generated by the calibrated first IMU and displaying the images. The motion data corresponds to motions of the mobile electronic device.

16 Claims, 7 Drawing Sheets

METHODS AND SYSTEMS FOR CALIBRATING AN INERTIAL MEASUREMENT UNIT OF AN ELECTRONIC DEVICE

TECHNICAL FIELD

This application relates generally to virtual-reality systems, including but not limited to calibrating inertial measurement units of electronic devices included in virtual-reality systems.

BACKGROUND

Virtual-reality head-mounted displays (HMDs) have wide applications in various fields, including engineering design, medical surgery practice, military simulated practice, video gaming, etc. Some HMDs include a mobile electronic device (e.g., a smartphone) that is inserted into a headset and used for displaying virtual-reality images. In such instances, motion data captured by a factory-installed inertial measurement unit of the mobile electronic device is used to generate the images. However, factory-installed inertial measurement units may not be sufficiently calibrated, if calibrated at all, and consequently, a user's virtual reality experience typically suffers.

SUMMARY

Accordingly, there is a need for methods and systems for calibrating inertial measurement units in mobile electronic devices used in virtual-reality systems. In some embodiments, a calibration procedure is performed that involves generating first calibration data by an inertial measurement unit (IMU) of the mobile electronic device and generating second calibration data by an additional, calibrated IMU of a controller included in the virtual-reality system; determining a difference between the first calibration data and the second calibration data; and calibrating the IMU of the mobile electronic device in accordance with the difference between the first calibration data and the second calibration data. Such methods and systems provide mobile electronic devices that are calibrated for virtual-reality applications, thereby improving a user's virtual reality experience.

In accordance with some embodiments, a method is performed at a mobile electronic device having a first IMU, one or more processors, and memory storing instructions for execution by the one or more processors. The mobile electronic device is inserted in a headset (e.g., the mobile electronic device and the headset compose a head-mounted display). The method includes, when a controller having a second IMU is mounted to the headset, performing a calibration procedure to generate first calibration data for the first IMU and second calibration data for the second IMU, receiving the second calibration data from the controller, and determining a difference between the first calibration data and the second calibration data received from the controller. The method further includes calibrating the first IMU in accordance with the difference between the first calibration data and the second calibration data. Additionally, the method further includes, when the controller has been removed from the headset after performing the calibrating, executing a virtual-reality application, comprising generating images based in part on motion data generated by the calibrated first IMU and displaying the images. The motion data corresponds to motions of the mobile electronic device.

In accordance with some embodiments, a mobile electronic device includes one or more processors/cores and memory storing one or more programs configured to be executed by the one or more processors/cores. The one or more programs include instructions for performing the operations of the method described above. In accordance with some embodiments, a non-transitory computer-readable storage medium has stored therein instructions that, when executed by one or more processors/cores of the mobile electronic device, cause the mobile electronic device to perform the operations of the method described above.

BRIEF DESCRIPTION OF THE DRAWINGS

For a better understanding of the various described embodiments, reference should be made to the Detailed Description below, in conjunction with the following drawings. Like reference numerals refer to corresponding parts throughout the figures and description.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known systems, methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first inertial measurement unit (IMU) could be termed a second IMU, and, similarly, a second IMU could be termed a first IMU, without departing from the scope of the various described embodiments. The first IMU and the second IMU are both IMUs, but they are not the same IMUs.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
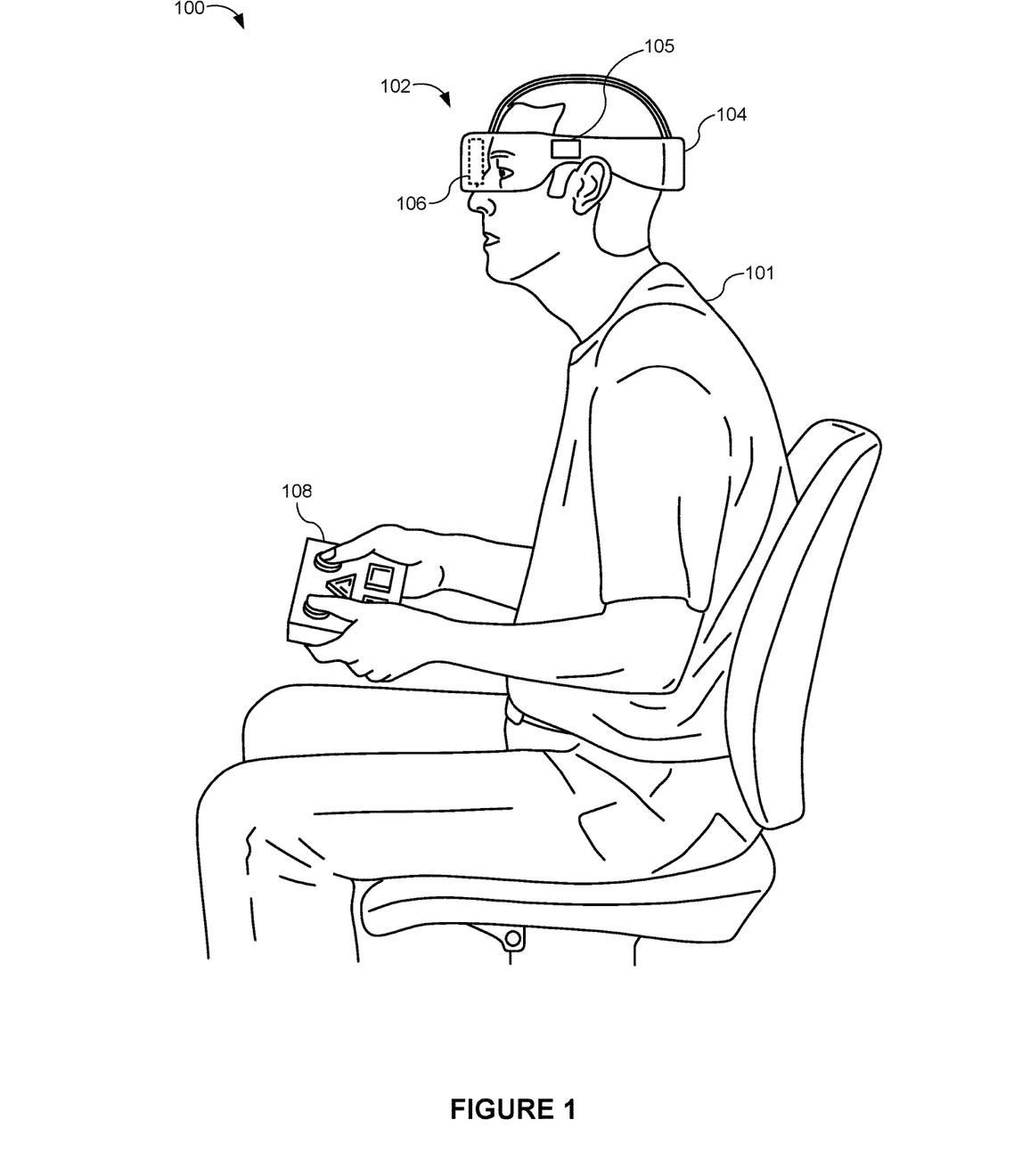
FIG. 1 is a view of a virtual-reality system that includes a head-mounted display and a controller, in accordance with some embodiments.

FIG. 1 is a view of a virtual-reality (VR) system 100 that includes a head-mounted display (HMD) 102 and a controller 108 (e.g., a hand-held controller, such as a video-game controller). The HMD 102 includes a headset 104. The headset 104 is secured to a head of a user 101 of the VR system 100. In some embodiments, the headset 104 is made at least partially from a non-rigid material, thereby allowing the headset 104 to be folded and stored/transported. Alternatively or in addition, in some embodiments, the headset 104 is made at least partially from rigid and/or semi-rigid material(s).

The headset 104 includes a mount 105 configured to receive and secure the controller 108 to the headset 104, such that the controller 108 may be removably mounted to the headset 104. When the controller 108 is secured to the headset 104 via the mount 105, the mount 105 constraints movement of the controller 108 in six degrees of freedom. In some embodiments, the mount 105 is a structure that receives a corresponding feature and/or portion of the controller 108 to secure the controller 108 to the headset 104 (e.g., a tongue and groove configuration). Alternatively or in addition, the mount 105 and the controller 108 each include one or more magnets, and the mount 105 secures the controller 108 to the headset 104 via the magnets. Although a single mount 105 is shown, the headset 104 may include multiple mounts 105 (e.g., depending on a shape and size of the controller 108).

The HMD 102 also includes a removable mobile electronic device 106 (e.g., cell phone, smartphone, PDA, tablet, gaming console, etc.). In some embodiments, the mobile electronic device 106 is inserted into a slot 110 (FIG. 2) of the headset 104. The slot 110 may be on a right or left side of the headset 104. In some embodiments, the slot 110 includes one or more guides to secure the mobile electronic device 106 inside the headset 104. Alternatively, in some embodiments, the mobile electronic device 106 is mounted to the headset 104. For example, although not shown, the headset 104 may include an opening (e.g., in a front portion of the headset 104), and the mobile electronic device 106 is mounted in the opening. In either configuration, a display 120 (FIG. 3B) of the mobile electronic device 106 is positioned in and occupies the field of vision of the user 101. When inserted into the slot 110, the mobile electronic device 106 is fixed in a particular orientation (i.e., each of the six degrees of freedom is constrained by the headset 104). In this way, the mobile electronic device 106 does not move with respect to the headset 104 during usage of the HMD 102. The same result is attained in those embodiments where the mobile electronic device 106 is mounted in the opening of the headset 104.

Figure 2:
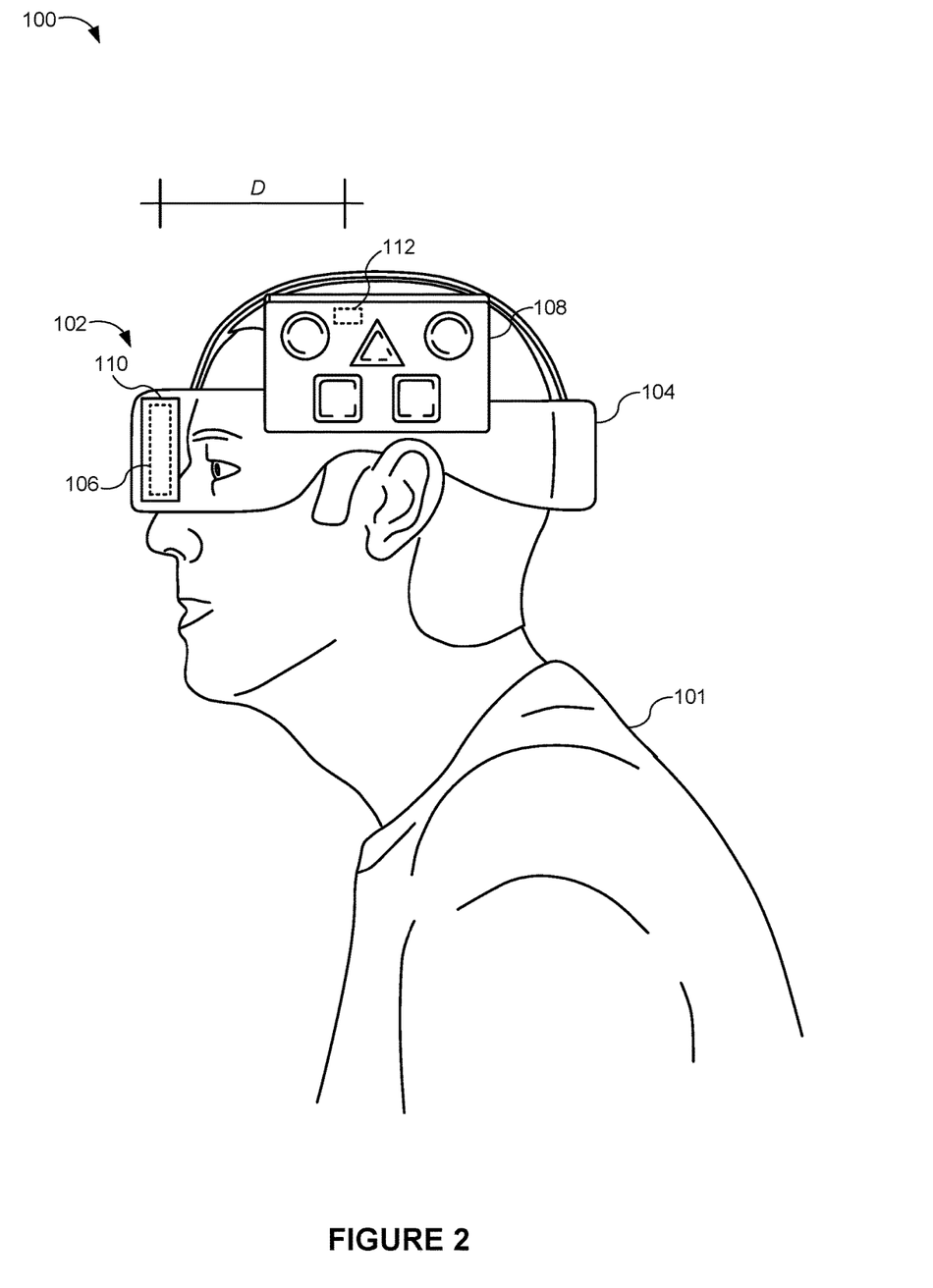
FIG. 2 is a view of the virtual-reality system with the controller mounted to the headset, in accordance with some embodiments.

FIG. 2 is a close up view of the VR system 100 with the controller 108 mounted to the headset 104, in accordance with some embodiments. The controller 108 includes an inertial measurement unit (IMU) 112, which undergoes a pre-calibration process (e.g., which is more rigorous than a pre-calibration process undergone by an IMU 118, FIG. 3B, in the mobile electronic device 106). For example, a separate calibration machine is used to pre-calibrate the IMU 112. The "pre-calibration process" occurs prior to the calibration process discussed below in method 500 (e.g., occurs in the factory during manufacturing). In light of this, the IMU 112 of the controller 108 (also referred to herein as a second IMU) may be referred to as being "pre-calibrated."

When the controller 108 is secured to the mount 105, the IMU 112 is located at a specified displacement (D) from the slot 110, and in turn the mobile electronic device 106. In addition, the mount 105 (FIG. 1) secures the controller 108, and in turn the IMU 112, to the headset 104 in a predefined orientation.

In some embodiments, the VR system 100 includes a calibration device, distinct and separate from the controller 108, which is secured to the mount 105, or is embedded in the headset 104. For example, instead of mounting the controller 108 to the headset 104, a distinct calibration device, which is also pre-calibrated, may be attached to the headset 104. In these instances, the calibration device includes the IMU 112. In some embodiments, the method 500 (FIGS. 5A-5B) is performed using the calibration device instead of the controller 108.

Figure 3A:
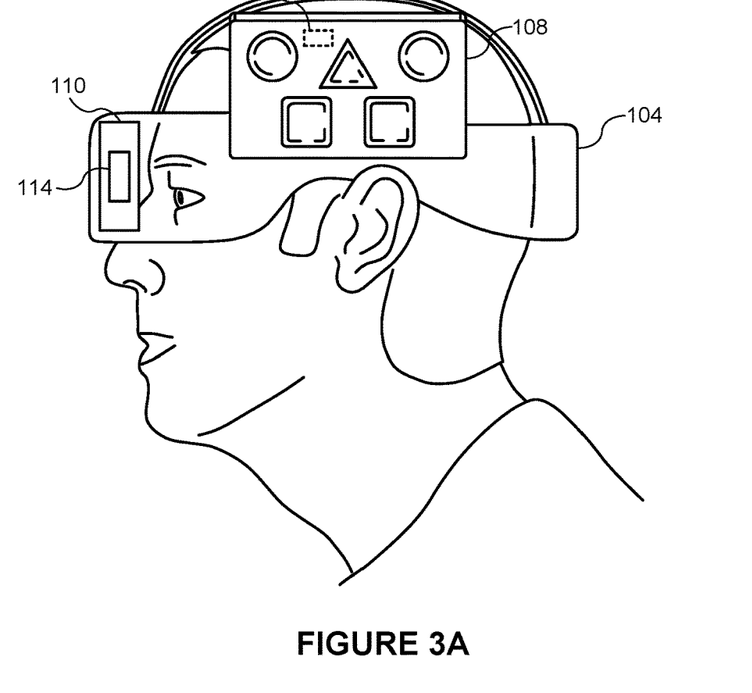
FIG. 3A is a view of a head-mounted display that includes a headset without the mobile electronic device inserted in the headset, and a controller mounted to the head-mounted display, in accordance with some embodiments.

FIG. 3A is a view of the headset 104 without the mobile electronic device 106 inserted in the headset 104 in accordance with some embodiments. In this view, a dock 114 of the headset 104 is shown. The dock 114 is positioned towards an end of the slot 110. For example, if the slot opening 110 is defined on a left side of the headset 104, then the dock 114 is positioned opposite the slot opening 110, towards a right side of the headset 104. The dock 114 is configured to couple with a connector 116 (FIG. 3B) of the mobile electronic device 106 when the mobile electronic device 106 is inserted in the slot 110 of the headset 104.

Figure 3B:
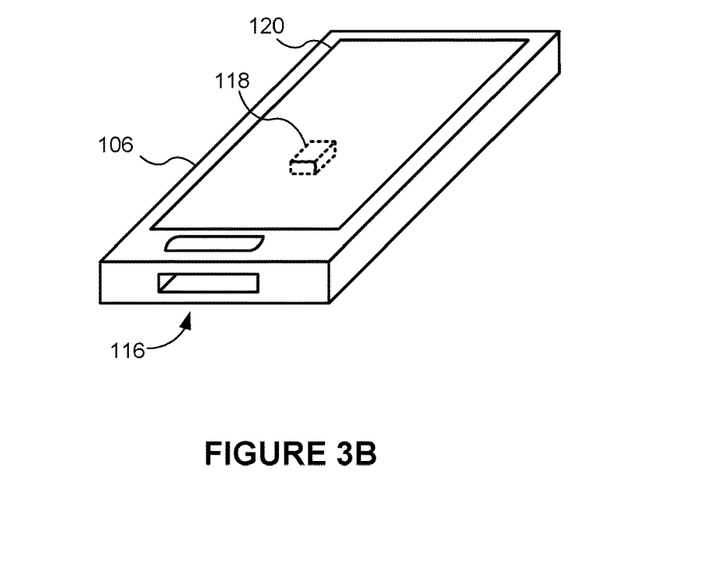
FIG. 3B is an isometric view of a mobile electronic device, in accordance with some embodiments.

FIG. 3B is an isometric view of the mobile electronic device 106. The mobile electronic device 106 includes the connector 116 that mates with the dock 114 (FIG. 3A) of the headset 104 when the mobile electronic device 106 is inserted in the headset 104. In addition, the mobile electronic device 106 includes an IMU 118 that is used for generating motion data based on motion of the mobile electronic device 106. The motion data generated by the IMU 118 is used by a processor (e.g., processor(s) 402, FIG. 4A) of the mobile electronic device 106 when generating images during execution of a virtual-reality application, such that the images account for motion of the headset 104. Unlike the IMU 112 in the controller 108, the IMU 118 of the mobile electronic device 106 is not pre-calibrated or may have undergone cursory pre-calibration (e.g., in the factory during manufacturing). As such, for the purposes of this disclosure, the IMU 118 (e.g., IMU 416, FIG. 4A) of the mobile electronic device 106 (also referred to herein as a first IMU) may be referred to as being "un-calibrated."

The VR system 100 thus includes a mobile electronic device 106 with an un-calibrated IMU 118 and a controller 108 with a pre-calibrated IMU 112 in accordance with some embodiments. The method 500 describes a calibration process for calibrating the un-calibrated IMU 118 using motion data generated by both IMUs. The motion data generated by both IMUs during the calibration process are referred to herein as "calibration data."

Figure 4A:
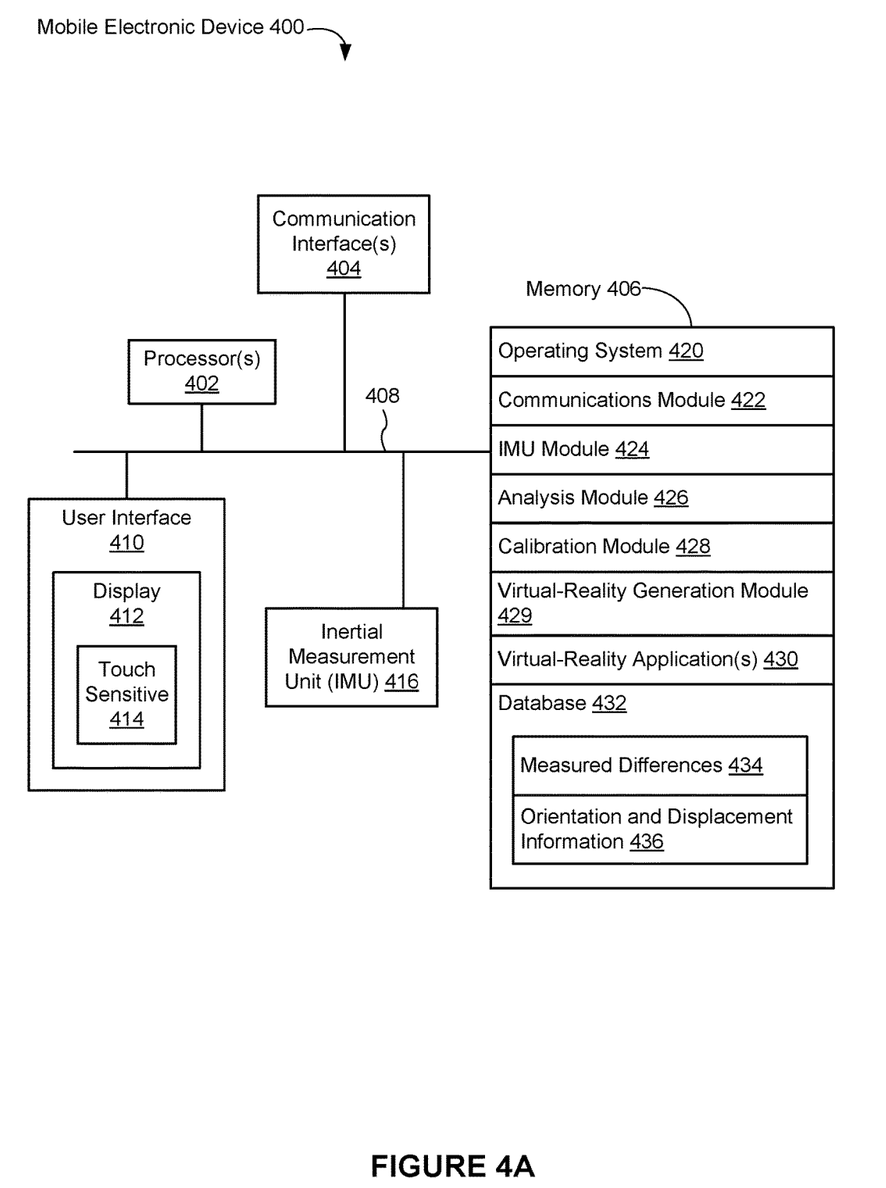
FIG. 4A is a block diagram illustrating a mobile electronic device, in accordance with some embodiments.

FIG. 4A is a block diagram illustrating a mobile electronic device 400, in accordance with some embodiments. The mobile electronic device 400 is an example of the mobile electronic device 106 (FIGS. 1, 2, 3B). The mobile electronic device 400 typically includes one or more processing units (processors or cores) 402, one or more network or other communications interfaces 404, memory 406, and one or more communication buses 408 for interconnecting these components. The communication buses 408 optionally include circuitry that interconnects and controls communications between system components. The mobile electronic device 400 includes a user interface 410. The user interface 410 typically includes a display device 412. In some embodiments, the display device 412 includes a touch-sensitive surface 414, in which case the display device 412 is a touch-sensitive display. The mobile electronic device 400 also optionally includes an image/video capture device, such as a camera and/or a webcam, and other common components and/or sensors known by those skilled in the art.

The mobile electronic device 400 includes an inertial measurement unit (IMU) 416 for detecting motion and/or a change in orientation of the mobile electronic device 400. The IMU 416 is an example of the IMU 118 (FIG. 3B). In some embodiments, the detected motion and/or orientation of the mobile electronic device 400 (e.g., the motion/change in orientation corresponding to movement of the user's head when the mobile electronic device 400 is inserted in headset 104, FIG. 1) is used to manipulate an interface (or content within the interface) displayed on the mobile electronic device 400 (e.g., manipulate a virtual-reality application executing on the mobile electronic device 400). In some embodiments, the IMU 416 includes one or more gyroscopes, accelerometers, and/or magnetometers (referred to herein as "instruments"). In some embodiments, the IMU 416 measures motion and/or a change in orientation for multiple axes (e.g., three axes, six axes, etc.). In such instances, the IMU 416 may include one or more instruments for each of the multiple axes.

In some embodiments, the one or more network or other communications interfaces 404 include hardware capable of data communications using any of a variety of wireless protocols (e.g., IEEE 802.15.4, WiFi, ZigBee, 6LoWPAN, Thread, Z-Wave, Bluetooth Smart, ISA100.11a, WirelessHART, MiWi, near-field communication (NFC), etc.), wired protocols (e.g., Ethernet), and/or any other suitable communication protocol, including communication protocols not yet developed as of the filing date of this document.

Memory 406 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 406 may optionally include one or more storage devices remotely located from the processor(s) 402. Memory 406, or alternately the non-volatile memory device (s) within memory 406, includes a non-transitory computer-readable storage medium. In some embodiments, memory 406 or the computer-readable storage medium of memory 406 stores the following programs, modules, and data structures, or a subset or superset thereof:

- an operating system 420 that includes procedures for handling various basic system services and for performing hardware-dependent tasks;
- a communications module 422 that is used for connecting the mobile electronic device 400 to other computers via the one or more communication interfaces 404 (wired or wireless) and one or more communication networks, such as the Internet, cellular telephone networks, mobile data networks, other wide area networks, local area networks, metropolitan area networks, personal area networks, and so on;
- an IMU module 424 for processing motion data generated by the IMU 416;
- an analysis module 426 for comparing motion data generated by the IMU 416 and another IMU (e.g., IMU 112 of the controller 108, FIG. 2);
- a calibrating module 428 for calibrating the IMU 416 based on the results of the comparison performed by the analysis module 426;
- a virtual-reality generation module 429 for generating images based in part on motion data generated by the IMU 416;
- one or more virtual-reality applications 430 (e.g., games, simulators, tutorials, calibration processes, etc.); and
- database 432, including but not limited to:
    - measured differences 434 between measurements taken by the IMU 416 and measurements taken by another IMU (e.g., IMU 112 of the controller 108, FIG. 2); and
    - orientation and displacement information 436 of another IMU (e.g., IMU 112 of the controller 108, FIG. 2) secured to the headset 104.

In some embodiments, the analysis module 426 is also used for transforming motion data generated by the IMU 416 and/or another IMU. For example, as shown in FIG. 3A, the controller 108 includes an IMU 112, which is displaced from the IMU 118 (FIG. 3B) of the mobile electronic device 106 by a distance (D). In addition, the IMU 112 has an orientation that differs from the orientation of the IMU 118. Accordingly, the analysis module 426 transforms the motion data or calibration data generated by the IMU 118 to account for the displacement and orientation of the IMU 118 with respect to the IMU 112 of the controller, or vice versa.

In some embodiments, the calibration module 428 is used for initiating a calibration procedure after the mobile electronic device 400 is connected with the headset 104 (FIG. 1). For example, the calibration module 428 executes one of the virtual-reality applications 430 and displays images from the virtual-reality application that prompt movement of the headset. In some embodiments, the calibration module 428 and the virtual-reality generation module 429 together generate and display the images that prompt movement of the headset.

Figure 4B:
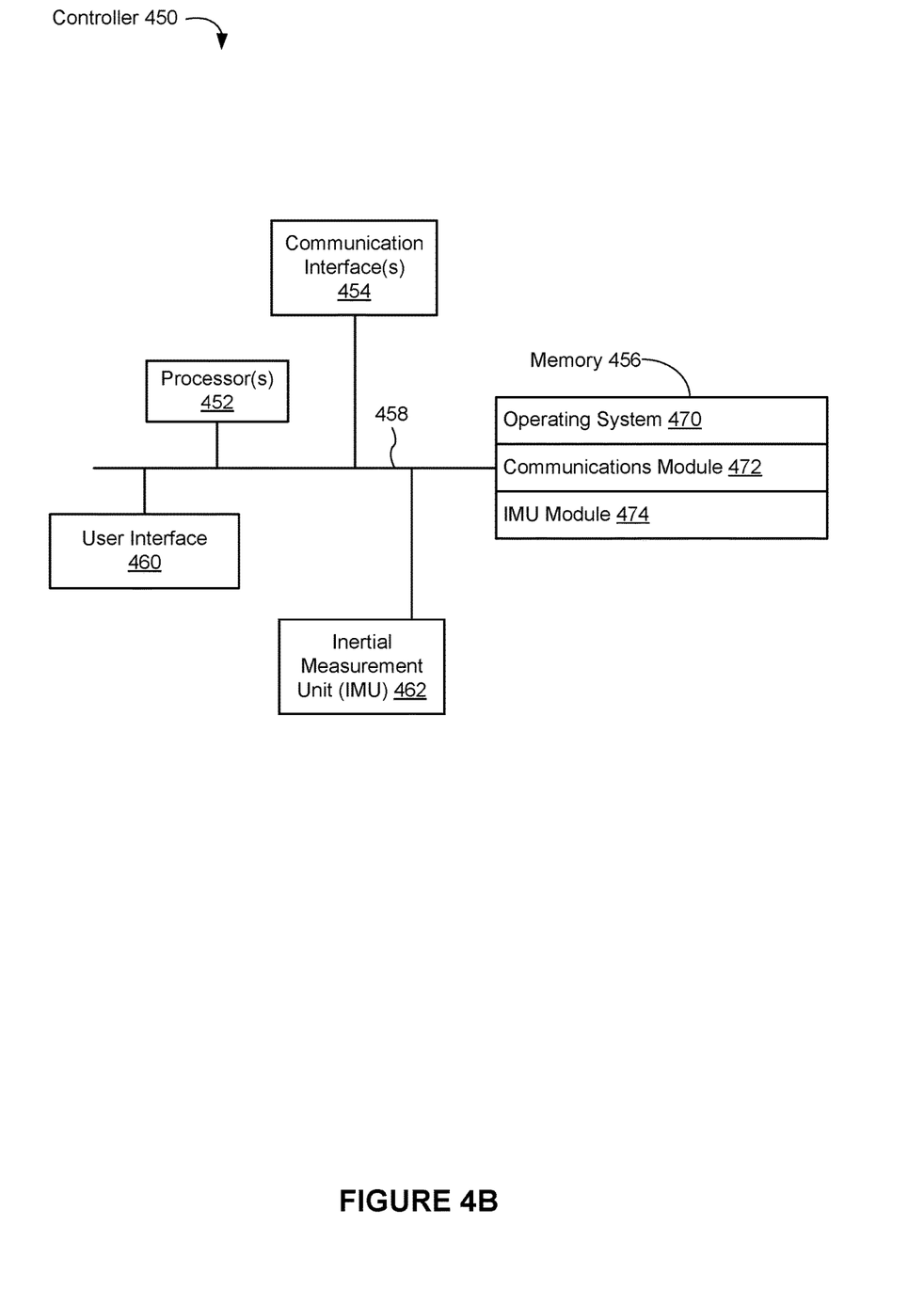
FIG. 4B is a block diagram illustrating a controller, in accordance with some embodiments.

FIG. 4B is a block diagram illustrating a controller 450, in accordance with some embodiments. The controller 450 is an example of the controller 108 (FIG. 1). The controller 450 typically includes one or more processing units (processors or cores) 452, one or more network or other communications interfaces 454, memory 456, and one or more communication buses 458 for interconnecting these components. The communication buses 458 optionally include circuitry (sometimes called a chipset) that interconnects and controls communications between system components. The controller 450 includes a user interface 460. In some embodiments, the user interface 460 includes one or more user input keys (e.g., input buttons), joysticks, thumbsticks, and/or other input pads. Alternatively or in addition, in some embodiments, the user interface 460 includes a touch-sensitive surface. In some embodiments, the touch-sensitive surface is configured to detect various swipe gestures (e.g., continuous gestures in various directions) and/or other gestures (e.g., single/double tap). The user interface 460 optionally includes an audio output device, such as speakers or an audio output connection connected to speakers, earphones, or headphones. Furthermore, some controllers 450 may use a microphone for inputting commands. Optionally, the controller 450 includes an audio input device (e.g., a microphone) to capture audio (e.g., speech from a user).

The controller 450 includes an IMU 462 for detecting motion and/or a change in orientation of the controller 450. The IMU 462 is an example of the IMU 112 (FIG. 3A). In some embodiments, the detected motion and/or orientation of the controller 450 (e.g., the motion/change in orientation corresponding to movement of the user's head when the controller 108 is mounted to the headset 104, FIG. 1) is compared to the detected motion and/or orientation of the mobile electronic device 400. In some embodiments, the IMU 462 includes one or more gyroscopes, accelerometers, and/or magnetometers. In some embodiments, the IMU 462 measures motion and/or a change in orientation for multiple axes (e.g., three axes, six axes, etc.). In such instances, the IMU 462 may include one or more instruments for each of the multiple axes.

In some embodiments, the one or more network or other communications interfaces 454 include, e.g., hardware capable of data communications using any of a variety of wireless protocols (e.g., IEEE 802.15.4, WiFi, ZigBee, 6LoWPAN, Thread, Z-Wave, Bluetooth Smart, ISA100.11a, WirelessHART, MiWi, near-field communication (NFC), etc.), wired protocols (e.g., Ethernet), and/or any other suitable communication protocol, including communication protocols not yet developed as of the filing date of this document.

Memory 456 includes high-speed random-access memory, such as DRAM, SRAM, DDR RAM, or other random-access solid-state memory devices; and may include non-volatile memory, such as flash memory devices or other non-volatile solid-state storage devices. Memory 456 may optionally include one or more storage devices remotely located from the processor(s) 452. Memory 456, or alternately the non-volatile memory device(s) within memory 456, includes a non-transitory computer-readable storage medium. In some embodiments, memory 456 or the computer-readable storage medium of memory 456 stores the following programs, modules, and data structures, or a subset or superset thereof:

- an operating system 470 that includes procedures for handling various basic system services and for performing hardware-dependent tasks;
- a network communications module 472 that is used for connecting the controller 450 to other computers (e.g., the mobile electronic device 400) via the one or more communication interfaces 454 (wired or wireless) and one or more communication networks, such as the Internet, cellular telephone networks, mobile data networks, other wide area networks, local area networks, metropolitan area networks, personal area networks, and so on; and
- an IMU module 474 for processing motion data generated by the IMU 462.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 406 and/or 456 store a subset of the modules and data structures identified above. Furthermore, memory 406 and/or 456 optionally store additional modules and data structures not described above. For example, the memory 406 and/or 456 may store one or more criteria and/or thresholds used during the calibration procedure discussed below with reference to method 500.

Figure 5A:
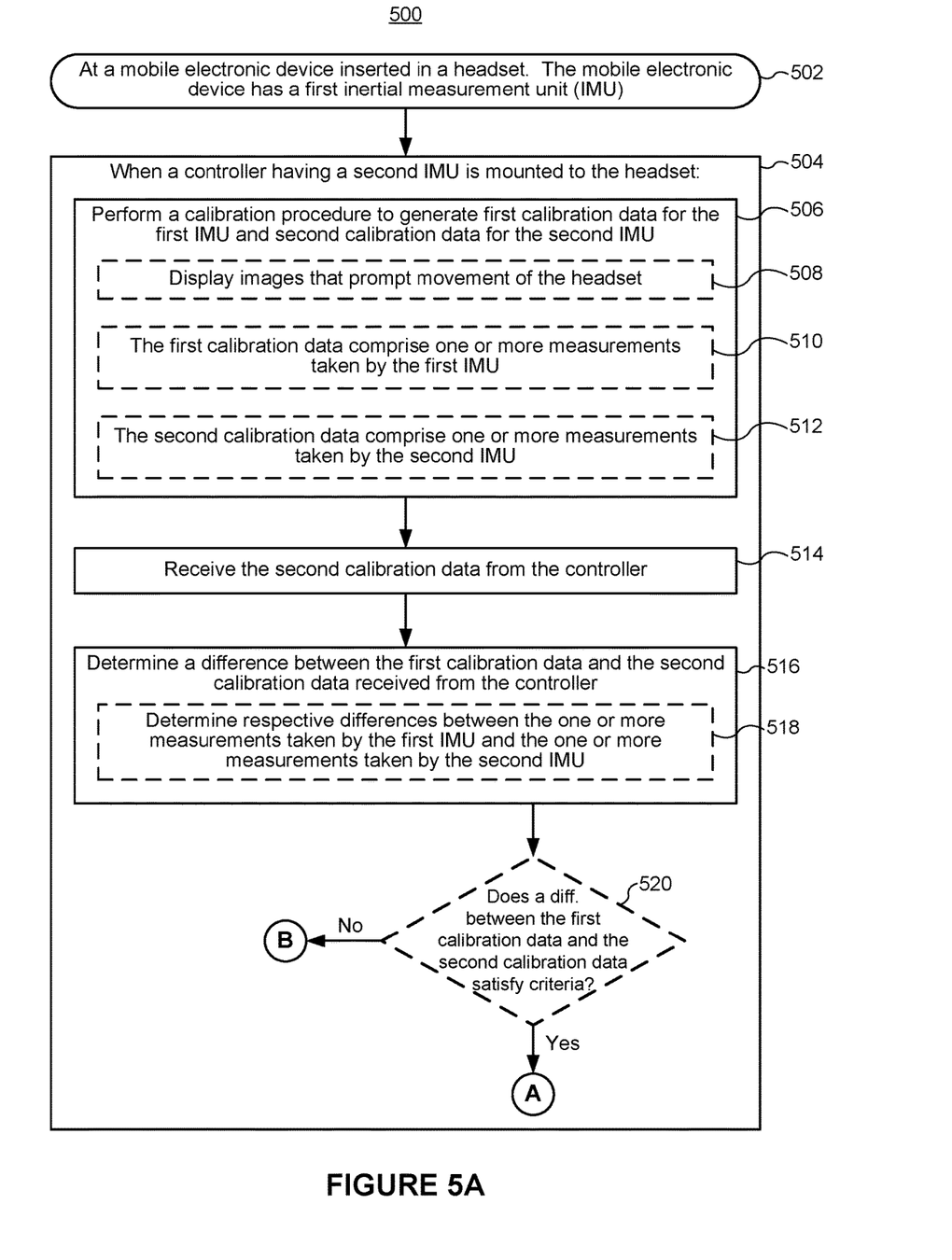
FIGS. 5A-5B are flow diagrams illustrating a method of calibrating an inertial measurement unit of a mobile electronic device, in accordance with some embodiments.
Figure 5B:
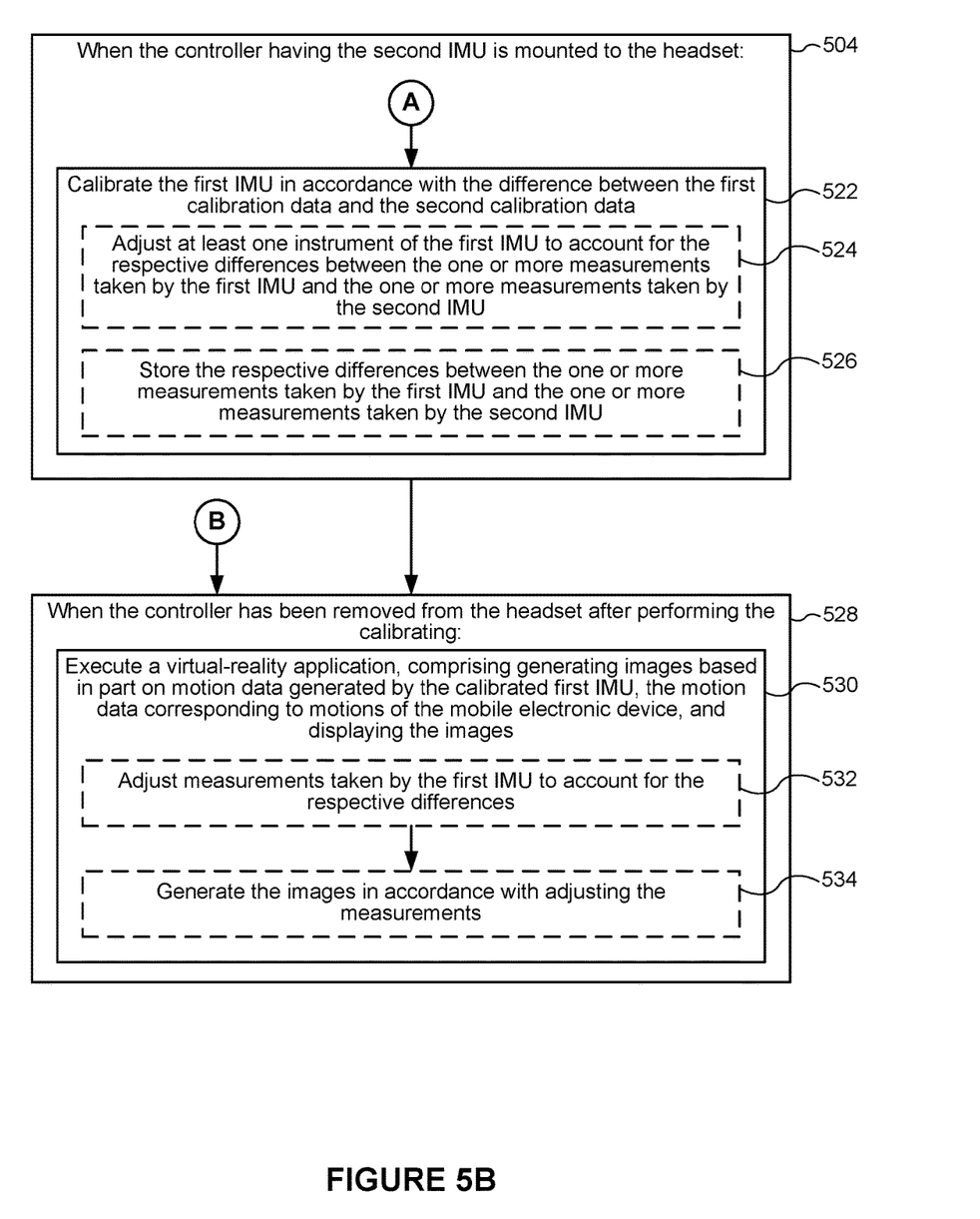

FIGS. 5A-5B illustrate flow diagrams for a method 500 of calibrating an IMU (e.g., IMU 118, FIG. 3B; IMU 416, FIG. 4A) of a mobile electronic device, in accordance with some embodiments. FIGS. 5A-5B correspond to instructions stored in a computer memory or computer-readable storage medium (e.g., memory 406 of the mobile electronic device 400, FIG. 4A). For example, the operations of method 500 are performed, at least in part, by an IMU module (e.g., IMU module 424, FIG. 4A), an analysis module (e.g., analysis module 426, FIG. 4A), a calibration module (e.g., calibration module 428, FIG. 4A), and/or a virtual-reality generation module (e.g., virtual-reality generation module 429, FIG. 4A).

The method 500 is performed (502) at a mobile electronic device (e.g., mobile electronic device 106, FIG. 1; mobile electronic device 400, FIG. 4A) inserted in a headset (e.g., headset 104, FIG. 1). In such a configuration, the mobile electronic device and the headset compose a head-mounted display (e.g., HMD 102, FIG. 1). The mobile electronic device includes a first IMU (e.g., IMU 118, FIG. 3B; IMU 416, FIG. 4A) and a display (e.g., display 120, FIG. 3B; display 412, FIG. 4A).

In performing the method 500, when a controller (e.g., controller 108, FIG. 1; controller 450, FIG. 4B) having a second IMU (e.g., IMU 112, FIG. 3A; IMU 462, FIG. 4B) is mounted to the headset (504), the mobile electronic device performs (506) a calibration procedure to generate first calibration data for the first IMU and second calibration data for the second IMU. In some embodiments, performing the calibration procedure comprises displaying, on the display, images (e.g., a series of images, a video, etc.) that prompt movement of the headset (508). In doing so, the first and second IMUs both generate calibration data for the same sequence of movements. To prompt movement of the headset and thus prompt movement of the user's head, the images may include a series of indicators. For example, the user is prompted (e.g., instructed) to move his or her head to position a respective indicator in a specific region(s) of the display. In another example, the mobile electronic device may display, on the display, a video with content to make the user to turn his or her head, which results in the first and second calibration data being generated (e.g., the video may include a bird flying in a peripheral region of the display that prompts the user to turn his or her head, thereby centering the bird in a central region of the display).

In some embodiments, the mobile electronic device includes a connector (e.g., connector 116, FIG. 3B) and the calibration procedure is performed in response to electrically coupling the connector with a dock (e.g., dock 114, FIG. 3A) of the headset. For example, after electrically coupling the connector with the dock, the mobile electronic device may execute a calibration application (e.g., one of the virtual-reality applications 430, FIG. 4A), which involves displaying the images that prompt movement of the headset (508).

As discussed above with reference to FIG. 2, the second IMU in the controller is pre-calibrated (i.e., the second IMU has undergone a previous calibration process), whereas the first IMU is un-calibrated (e.g., the first IMU has undergone, at most, a cursory factory calibration process that is less rigorous than the previous calibration process for the second IMU). Accordingly, the first IMU may be less accurate than the second IMU.

In some embodiments, the first calibration data comprise one or more measurements taken by the first IMU (510) and the second calibration data comprise one or more measurements taken by the second IMU (512). The one or more measurements taken by the first IMU may include measurements of yaw, pitch, and roll, and the one or more measurements taken by the second IMU may also include measurements of yaw, pitch, and roll. The one or more measurements may include, but are not limited to: specific force, angular velocity, magnetic field, and others measurements known by those skilled in the art.

The first and second IMUs each comprise a plurality of instruments (e.g., one or more gyroscopes, one or more accelerometers, one or more magnetometers, etc.). In some embodiments, the first and second IMUs each comprise a respective accelerometer and a respective gyroscope for each dimension in three-dimensional space (sometimes referred to by those skilled in the art as an accelerometer triad and a gyroscope triad). Additionally, in some embodiments, the first and second IMUs each further comprise a respective magnetometer for each dimension in three-dimensional space. Those skilled in the art will appreciate that the first and second IMUs may include other and/or additional instruments.

In some embodiments, instead of the controller having the second IMU, the headset includes the second IMU (e.g., the second IMU is embedded in the headset). For ease of discussion, the following method steps refer to the controller including the second IMU, but it should be understood that the method applies equally to the embodiments where the headset includes the second IMU (and in some embodiments, other components (e.g., processor(s) 452 and communications interface(s) 454) and modules shown in FIG. 4B).

The mobile electronic device receives (514) the second calibration data from the controller. In some embodiments, the second calibration data is received using a wired connection (e.g., through the mount 105, FIG. 1). Alternatively, in some embodiments, the second calibration data is received using a wireless connection. As noted above, the mobile electronic device and the controller both include hardware capable of data communications using a wireless protocol. As such, in some embodiments, the mobile electronic device establishes a wireless communication channel with the controller, using the wireless protocol, and the second calibration data is received via the wireless communication channel. For example, the second calibration data is received using near-field communication (NFC), a wireless personal-area network (WPAN) (e.g., Bluetooth, BLE, Zigbee, etc.), wireless local-area network (e.g., WiFi), or some other wireless communication protocol.

The mobile electronic device determines (516) a difference between the first calibration data and the second calibration data received from the controller. In some embodiments, when determining the difference between the first calibration data and the second calibration data, the mobile electronic device determines (518) respective differences between the one or more measurements taken by the first IMU and the one or more measurements taken by the second IMU.

When the controller is mounted to the headset, the controller has a predefined orientation with respect to the headset. In addition, the second IMU has a specified displacement (e.g., displacement (D), FIG. 2) and orientation with respect to the first IMU (e.g., the second IMU is perpendicular (or some other degree in the X, Y, and/or Z axes) to the first IMU). In some embodiments, the controller communicates its orientation and displacement information to the mobile electronic device (e.g., via the established wireless communication channel or wired connection) and the mobile electronic device stores the received information (e.g., stored in orientation and displacement information 436, FIG. 4A). In some embodiments, the orientation and displacement information is known to the mobile electronic device (e.g., is accessible in a look-up table). Accordingly, in some embodiments, before determining the difference between the first calibration data and the second calibration data, the mobile electronic device transforms the second calibration data to account for the specified displacement and orientation of the second IMU with respect to the first IMU, or vice versa. As such, when determining the difference between the first calibration data and the second calibration data (516), the mobile electronic device uses the transformed second calibration data (or the transformed first calibration data).

The mobile electronic device calibrates (522, FIG. 5B) the first IMU in accordance with the difference between the first calibration data and the second calibration data. As noted above, in some embodiments, the first IMU comprises a plurality of instruments, the first calibration data comprise one or more measurements taken by the first IMU, and the second calibration data comprise one or more measurements taken by the second IMU. Accordingly, in some embodiments, to calibrate the first IMU, the mobile electronic device adjusts (524) at least one instrument of the first IMU to account for the respective differences between the one or more measurements taken by the first IMU and the one or more measurements taken by the second IMU.

In some embodiments, to calibrate the first IMU, the mobile electronic device stores (526) the respective differences between the one or more measurements taken by the first IMU and the one or more measurements taken by the second IMU (e.g., stores the respective differences in the measured differences 434, FIG. 4A) for subsequent use during execution of a virtual-reality application. In doing so, the mobile electronic device may avoid adjusting instruments of the first IMU.

In some embodiments, before calibrating the first IMU, the mobile electronic device determines (520) whether the difference between the first calibration data and the second calibration data satisfies one or more criteria. In response to determining that the difference between the first calibration data and the second calibration data does not satisfy the one or more criteria (520—No), the mobile electronic device executes (532) a virtual-reality application (e.g., a gaming application). In this way, the mobile electronic device skips the calibrating step (522) when the difference between the first calibration data and the second calibration data does not satisfy the one or more criteria.

In response to determining that the difference between the first calibration data and the second calibration data satisfies the one or more criteria (520—Yes), the mobile electronic device calibrates the first IMU (522). In some embodiments, the one or more criteria are satisfied when at least one measurement of the one or more measurements taken by the first IMU differs from at least one measurement of the one or more measurements taken by the second IMU by a threshold amount. In some embodiments, a first threshold amount is set for a first measurement (e.g., angular velocity), a second threshold amount is set for a second measurement (e.g., specific force), and so on.

When the controller has been removed from the headset after performing the calibrating (528), the mobile electronic device executes (530) the virtual-reality application, which includes generating images based in part on motion data generated by the calibrated first IMU and displaying the images. The motion data corresponds to motions of the mobile electronic device.

In some embodiments, while executing the virtual-reality application (530), the mobile electronic device adjusts (532) measurements taken by the first IMU to account for the respective differences stored by the mobile electronic device (e.g., the adjustments are made using the stored measured differences 434, FIG. 4A). For example, the respective differences stored by the mobile electronic device act as offsets, which allow the mobile electronic device to efficiently adjust the measurements taken by the first IMU. In this way, the mobile electronic device generates (534) the images in accordance with the adjustments to the measurements.

The method 500 thus allows virtual-reality images to be generated that accurately correspond to the user's head motions.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
at a mobile electronic device inserted in a headset, wherein the mobile electronic device has a first inertial measurement unit (IMU):
when a controller having a second IMU is mounted to the headset:
performing a calibration procedure to generate first calibration data for the first IMU and second calibration data for the second IMU;
receiving the second calibration data from the controller;
determining a difference between the first calibration data and the second calibration data received from the controller; and
calibrating the first IMU in accordance with the difference between the first calibration data and the second calibration data;
when the controller has been removed from the headset after performing the calibrating:
executing a virtual-reality application, comprising generating images based in part on motion data generated by the calibrated first IMU, the motion data corresponding to motions of the mobile electronic device, and displaying the images.

2. The method of claim 1, wherein performing the calibration procedure comprises displaying images that prompt movement of the headset.

3. The method of claim 1, wherein:
the mobile electronic device comprises a connector; and
the calibration procedure is performed in response to electrically coupling the connector with a dock of the headset.

4. The method of claim 1, wherein:
the first calibration data comprise one or more measurements taken by the first IMU;
the second calibration data comprise one or more measurements taken by the second IMU; and determining the difference between the first calibration data and the second calibration data comprises determining respective differences between the one or more measurements taken by the first IMU and the one or more measurements taken by the second IMU.

5. The method of claim 4, wherein:
the first IMU comprises a plurality of instruments; and
calibrating the first IMU comprises adjusting at least one instrument of the first IMU to account for the respective differences between the one or more measurements taken by the first IMU and the one or more measurements taken by the second IMU.

6. The method of claim 4, wherein:
calibrating the first IMU comprises storing the respective differences between the one or more measurements taken by the first IMU and the one or more measurements taken by the second IMU; and
the method further comprises, while executing the virtual-reality application, adjusting measurements taken by the first IMU to account for the respective differences; wherein generating the images is performed in accordance with adjusting the measurements.

7. The method of claim 4, wherein:
the one or more measurements taken by the first IMU comprise measurements of yaw, pitch, and roll; and
the one or more measurements taken by the second IMU comprise measurements of yaw, pitch, and roll.

8. The method of claim 1, wherein calibrating the first IMU is performed in response to determining that the difference between the first calibration data and the second calibration data satisfies one or more criteria.

9. The method of claim 1, wherein the second calibration data is received using near-field communication.

10. The method of claim 1, further comprising, at the mobile electronic device inserted in the headset, establishing a wireless communication channel with the controller, wherein the second calibration data is received via the wireless communication channel.

11. The method of claim 1, wherein the first and second IMUs each comprise a respective accelerometer and a respective gyroscope for each dimension in three-dimensional space.

12. The method of claim 1, wherein the mobile electronic device and the headset compose a head-mounted display.

13. The method of claim 1, wherein, when the controller is mounted to the headset:
the controller has a predefined orientation with respect to the headset; and
the second IMU has a specified displacement and orientation with respect to the first IMU.

14. The method of claim 13, wherein:
the method further comprises, at the mobile electronic device inserted in the headset, transforming the second calibration data to account for the specified displacement and orientation of the second IMU with respect to the first IMU; and
determining the difference between the first calibration data and the second calibration data is performed using the transformed second calibration data.

15. A mobile electronic device, comprising:
a first inertial measurement unit (IMU);
one or more processors; and
memory storing one or more programs for execution by the one or more processors, the one or more programs including instructions for:

when the mobile electronic device is inserted in a headset and a controller having a second IMU is mounted to the headset:
  performing a calibration procedure to generate first calibration data for the first IMU and second calibration data for the second IMU;
  receiving the second calibration data from the controller;
  determining a difference between the first calibration data and the second calibration data received from the controller; and
  calibrating the first IMU in accordance with the difference between the first calibration data and the second calibration data;
when the mobile electronic device is inserted in the headset and the controller has been removed from the headset after performing the calibrating:
  executing a virtual-reality application, comprising generating images based in part on motion data generated by the calibrated first IMU, the motion data corresponding to motions of the mobile electronic device, and displaying the images.

16. A non-transitory computer-readable storage medium, storing one or more programs configured for execution by one or more processors of a mobile electronic device having a first inertial measurement unit (IMU), the one or more programs including instructions, which when executed by the one or more processors cause the mobile electronic device to:
when the mobile electronic device is inserted in a headset and a controller having a second IMU is mounted to the headset:
  perform a calibration procedure to generate first calibration data for the first IMU and second calibration data for the second IMU;
  receive the second calibration data from the controller;
  determine a difference between the first calibration data and the second calibration data received from the controller; and
  calibrate the first IMU in accordance with the difference between the first calibration data and the second calibration data;
when the mobile electronic device is inserted in the headset and the controller has been removed from the headset after performing the calibrating:
  execute a virtual-reality application, comprising generating images based in part on motion data generated by the calibrated first IMU, the motion data corresponding to motions of the mobile electronic device, and displaying the images.

* * * * *